United States Patent [19]

McLachlan et al.

[11] Patent Number: 5,026,565
[45] Date of Patent: Jun. 25, 1991

[54] REMOVAL OF LIPID COMPONENTS FROM FOODSTUFFS AND PRODUCTS THEREOF

[75] Inventors: Corran N. S. McLachlan, 29 Summer Street, Devonport, Auckland, New Zealand; Owen J. Catchpole, Birmingham, England; Ross S. Nicol, Victoria, Australia

[73] Assignee: Corran Norman Stuart McLachlan, Devonport, New Zealand

[21] Appl. No.: 434,818

[22] Filed: Nov. 13, 1989

Related U.S. Application Data

[63] Continuation-in-part of Ser. No. 314,216, Feb. 22, 1989, abandoned, which is a continuation-in-part of Ser. No. 269,760, Nov. 10, 1988, abandoned, which is a continuation-in-part of Ser. No. 144,384, Jan. 26, 1988, abandoned.

[30] Foreign Application Priority Data

Aug. 19, 1987 [NZ] New Zealand ................ 221503

[51] Int. Cl.$^5$ .................. A23L 1/31; A23L 1/325; C11B 3/00
[52] U.S. Cl. .................. 426/241; 260/412.6; 260/412.8; 260/428.5; 426/312; 426/318; 426/385; 426/417; 426/480; 426/641; 426/643; 426/644
[58] Field of Search ............... 426/241, 242, 312, 317, 426/318, 580, 641, 646, 655, 385, 417, 425, 429, 455, 472, 473, 479, 480, 481, 643, 644; 260/412, 412.6, 412.8, 427, 428.5; 530/422, 427; 210/690; 55/74

[56] References Cited

U.S. PATENT DOCUMENTS

| | | | |
|---|---|---|---|
| 3,067,043 | 12/1962 | Marsh et al. ................ | 426/385 X |
| 3,939,281 | 2/1976 | Schwengers ................ | 426/417 X |
| 4,096,283 | 6/1978 | Rahman ................ | 426/385 X |
| 4,280,961 | 7/1981 | Schneider et al. ................ | 260/412.8 |
| 4,331,695 | 5/1982 | Zosel ................ | 426/417 X |
| 4,466,923 | 8/1984 | Friedrich ................ | 260/412.8 X |
| 4,493,854 | 1/1985 | Friedrich et al. ................ | 426/417 X |
| 4,734,226 | 3/1988 | Parker et al. ................ | 426/417 X |
| 4,749,522 | 6/1988 | Kamarei ................ | 260/412.8 |

FOREIGN PATENT DOCUMENTS 250302 3/1964 Australia ................ 426/385
135847 1/1984 Japan .

OTHER PUBLICATIONS

Van Arsdel et al, *Food Dehydration*, vol. 2, 1973, pp. 170, 257, 258.

*Primary Examiner*—Arthur L. Corbin
*Attorney, Agent, or Firm*—Pennie & Edmonds

[57] ABSTRACT

A process for the removal of sterols and/or lipid components (e.g., cholesterol and fats) from lipid containing food (e.g., meat) using sub or super-critical fluids (e.g., $CO_2$) involves initial processing of the food to produce an intermediate moisture product in which substantially all of the "free water" but not all of the "bound water" is removed. Different moisture removal techniques may be used. Where freeze drying of food flakes is adopted the moisture level is preferably reduced to 30–55% w/w. The intermediate moisture product is treated with supercritical $CO_2$ to remove the lipids therefrom. Optionally the cholesterol can be separated from the fat component by use of an absorbent to selectively remove the cholesterol from the supercritical $CO_2$. The product can be reconstituted with water and fat to provide a reconstituted meat product suitable for hamburgers.

29 Claims, 7 Drawing Sheets

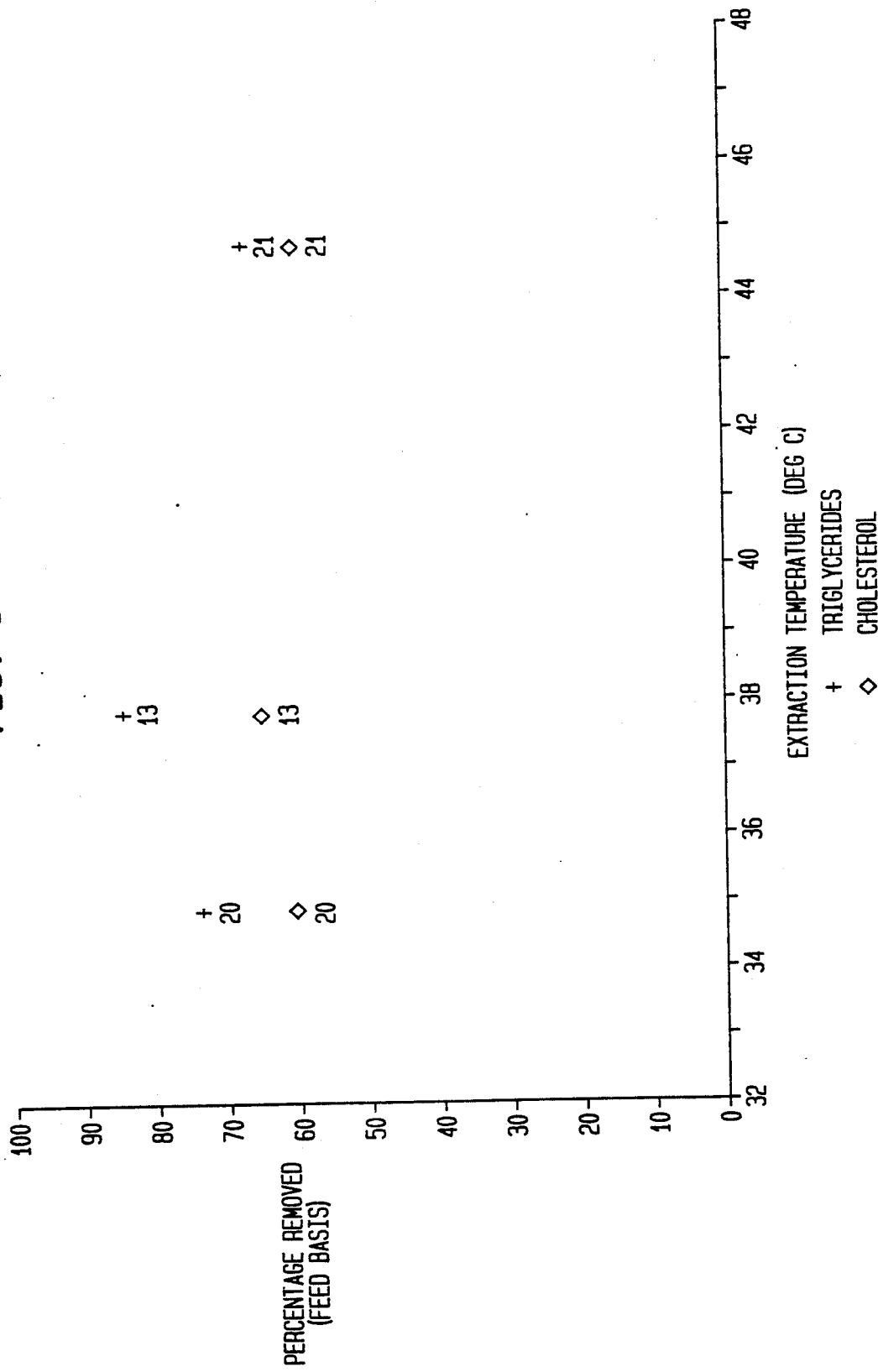

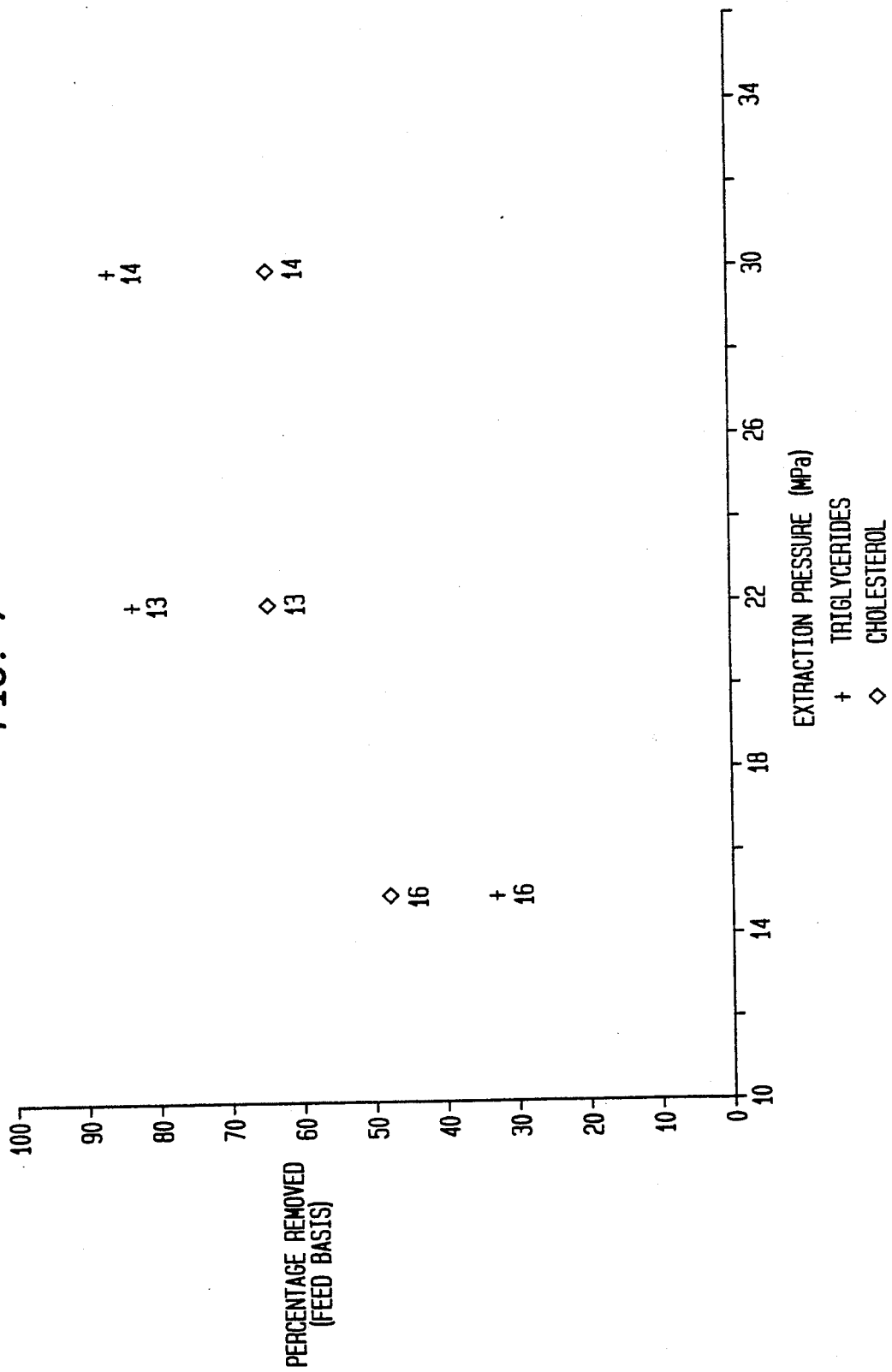

REMOVAL OF LIPID COMPONENTS FROM FOODSTUFFS AND PRODUCTS THEREOF

CROSS REFERENCES TO RELATED APPLICATIONS

This application is a continuation-in-part of application Ser. No. 314,216 filed Feb. 22, 1989, now abandoned, which is a continuation-in-part of application Ser. No. 269,760, filed Nov. 10, 1988 now abandoned, which in turn is a continuation-in-part of application Ser. No. 144,384, filed Jan. 26, 1988, now abandoned.

FIELD

This invention relates to the removal of lipids from foodstuffs and in particular it relates to the production of reconstituted meat products. It has general application to the removal of sterols and/or lipid components from lipid containing foods, such as meat, fish, poultry and game, and dairy products, using high pressure fluids. It is useful in the preparation of low cholesterol or low fat foodstuffs.

BACKGROUND

Some meats have a limited market acceptance because of their strong flavour, or in some cases the unacceptable smell associated with the meat fat. Lamb is an example of this as it is not acceptable to many people and in particular is not readily marketable in Asia.

There is also concern over the level of fat and cholesterol in foodstuffs. In addition to concern over the presence of saturated fats in our diet, it is likely that legislation will be enacted in some countries which will require cholesterol content to be shown along with other nutritional values when the foodstuff is sold.

The primary source of cholesterol in foodstuffs is lipid-containing food such as meat, either red or white, fish and dairy products. Offal, such as brains or kidney, has a high cholesterol content but a relatively low lipid content.

The lipid components of interest are those known as neutral lipids. This class of lipids contains: mono-, di- and tri-acylglycerides, collectively known as fat; free and esterified cholesterol, and other sterols; free fatty acids, fatty alcohols and wax esters. Of most interest are the fat and cholesterol components.

These lipid components may also influence the flavour of the food, especially if the fat becomes rancid. Oxidation of fat destabilises the fat molecules giving rise to unpleasant flavours. The amount and type of fat present in the food is one of the limiting factors in storage of meats. Meats with a high proportion of unsaturated fats—fish, poultry, pork, lamb, and veal, —cannot be kept as long as beef. Some meats e.g. lamb because of their fat content have an unacceptable flavour.

PRIOR ART

High pressure physiologically acceptable fluids (especially supercritical fluids) have been used as solvents to extract natural materials for food and drug applications. Extraction with a high pressure fluid such as carbon dioxide offers advantages over conventional solvent extraction especially when applied to food as carbon dioxide is non toxic, non polluting, non flammable, and has bacteriostatic properties. Suitable high pressure extraction fluids include:

$CO_2$, $N_2O$, $CF_3Cl$, $CF_2Cl_2$, $CH_2CF_2$, $SF_6$, $CHF_3$, $CHF_2Cl$, $CF_3Cl$, $CF_2CH_2$, $C_3F_8$, ethane, ethylene, or mixtures thereof, and other gases unobjectionable from a health point of view, and which will be sub or supercritical in temperature and pressure ranges suitable for the processing of foodstuffs.

Liquid $CO_2$ and more especially Supercritical $CO_2$ have been used to extract caffeine from coffee, and flavourings from tea, chicory, fruit essences, herbs, and spices.

OBJECT

It is an object of the present invention to provide an improved process for the removal of lipids from foods.

SUMMARY OF THE INVENTION

In one aspect the invention provides a method of removing sterols and/or lipids from food including:

(a) drying the food to remove all or substantially all of the "free water" but not all of the "bound water" to produce an intermediate moisture product, and (b) removing some of the sterols and/or lipids therefrom using a sub or supercritical physiologically acceptable gas.

By processing an intermediate moisture product as in step (b), the resultant low fat product can be reconstituted with fat and water to provide a flavour enhanced product and one which may also be low in cholesterol.

In another aspect the invention provides a reconstituted meat product produced by the process of the previous paragraphs.

Thus this process allows for the production of reconstituted meat products, eg meat suitable for hamburgers. It has been found that the reconstituted product has an acceptable texture and an "improved" flavour.

Preferably the sub or supercritical physiologically acceptable gas is supercritical $CO_2$.

The moisture level is reduced to less than 60% w/w, and many different moisture removal techniques may be used. It is preferred that the food is dried to a moisture level in the range of 25–60% w/w. Where freeze drying of food flakes is adopted the moisture level is reduced to 30–55% w/w and more preferably to 30–40% w/w.

The at least partly dried low-lipid (and hence low cholesterol) food product can be stored in or transported in that form to save weight. Normally it will be reconstituted into a form acceptable to the consumer.

Optionally the cholesterol can be separated from the fat component and some of the cholesterol-free fat added back to the protein product prior to or during reconstitution of the food product.

In another embodiment the reconstituted meat can be blended from partly processed fat meat and from fresh lean beef to retain the natural meat colour. By this means it is possible to remove, say, approximately 80% of the cholesterol from the fat meat and then to blend it with fresh lean beef to obtain a 50% overall reduction in cholesterol.

The above gives a broad description of the present invention, a preferred form of which will now be described by way of example with reference to the accompanying drawings in which:

BRIEF DESCRIPTION OF THE DRAWINGS

FIG. 6 is a graph showing the relationship of extraction temperature to lipid removal;

FIG. 7 is a graph showing the relationship of extraction pressure to lipid removal.

MEAT PRODUCTS

Figure 1:
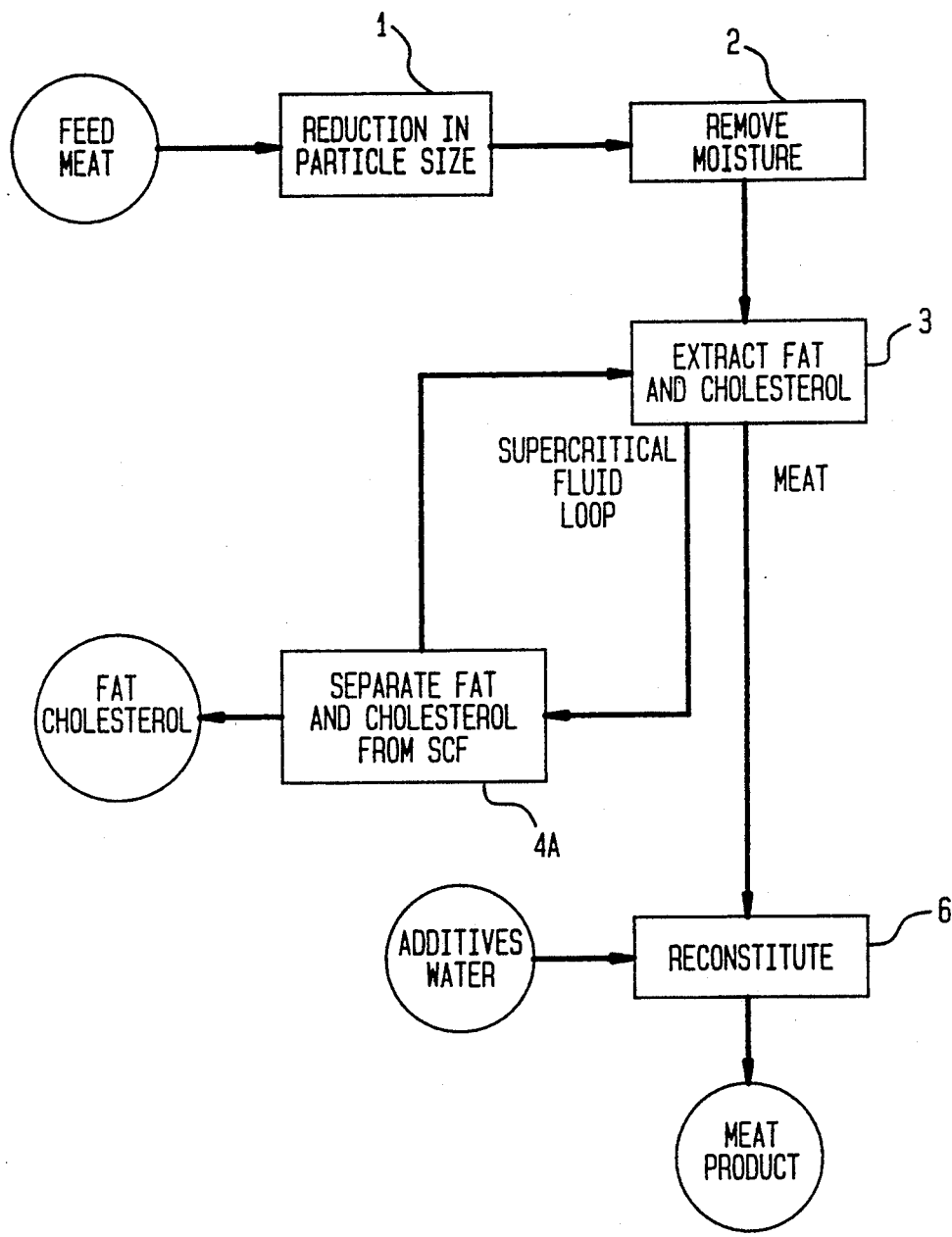
FIG. 1 is a flow chart showing a first process for the removal of lipid components from meat.

The preferred processes will be described with reference to meat products and in particular the provision of an intermediate moisture meat product or a reconstituted meat product suitable for hamburgers.

It has been discovered that the reduction in the moisture content of the meat to such a level that "free" moisture is removed results in supercritical $CO_2$ being able to penetrate and remove virtually all the intra-muscular lipids and the majority of the cholesterol.

The published data for such a moisture level variously estimated is 39–40% to 26%, the precise figure varies with both type of breed and differs from species to species so that poultry for example has a different figure to the average beef figure. Our results compare favourably with the upper figure.

Under such conditions the extracted meat with fat added back retains its texture and generally has an enhanced flavour with minor acceptable change in colour, and its water-binding capacity. The colour can be allowed to re-bloom in the presence of oxygen (i.e. when the $CO_2$ has been removed).

Tasting of the reconstituted meat product revealed that the process can be used to change the strong taste of "grass-fed beef" to a milder taste approximating that of "grain fed beef" or in some cases the taste of veal. The process can also be used to vary the taste of mutton so that eg the flavour that is objectionable to people of certain ethnic groups can be removed or modified.

It has been discovered that contact with supercritical $CO_2$ under these conditions caused an unexpected dramatic reduction of bacteria from $10^4$–$10^5$ units/gm to undetectable levels. Meat subject to this treatment has kept its colour and texture for at least four months at 5° C. If it is so required, such bacteria-free fat, after separation of cholesterol and deposition from the supercritical fluid may be removed or returned to the extracted meat.

Cholesterol may be removed from the supercritical fluid by passing the laden supercritical fluid through a bed of a suitable adsorbent. Adsorbents are known which can selectively remove cholesterol from fats. However in accordance with this invention there is provided a class of adsorbents which remove a higher percentage of the cholesterol. These adsorbents are selected from the group consisting of compounds of alkali metal, alkaline earth metal and transition metals (including zinc) and organic substances, eg carbohydrates such as $\beta$-cyclodextrin. Using these adsorbents, the extraction process can be operated as a constant pressure recycle process.

In the latter option it may prove advantageous, largely on economic grounds to reduce the pressure of the extraction system to 100–150 bar, preferably 120–150 bar. Under these conditions the degree of extraction of lipid relative to that of cholesterol; is substantially reduced.

The use of the supercritical solvent in this mode allows the replacement of some of the low-molecular weight substances that are found to produce cooking odours which are objectionable to some ethnic groups, as is the case with lamb or mutton. It is also possible to introduce other odour compounds eg by adding such compounds to an adsorbent material which is then eluted by the supercritical fluid steam prior to contact with the meat.

If required the fat level of the extracted meat can be reduced by any intermediate desired value by a combination of the above separation steps.

As a final step, if required, the residual $CO_2$ present in the meat and fat may be removed by vacuum stripping or purging with an inert gas such as nitrogen, if required.

CHOLESTEROL AND ANIMAL FAT REMOVAL

In Japan Patent No. 59135847 (to QP Corp) a process is described for the removal of cholesterol from foodstuffs. The specification states that the foodstuff needs to be dried to 15% or less water and preferably 2–8% to achieve high removal of cholesterol. A claimed advantage of the process is that significantly lower range of fats and oils are removed than in traditional solvent extraction processes.

In the current application it was therefore surprising to find that lipids could be virtually completely removed by reducing the moisture level to only 30–40%, and that up to 80% of cholesterol could be extracted from lean meat under these conditions. The actual extraction of cholesterol would be significantly higher in meats of higher fat content. We have also discovered that this moisture level has a particular significance in the structural characteristics of the meat as is described below.

The economic significance of the above discovery is appreciable in that reduction of moisture levels to 30–40% requires about one-third to one-fifth the time to reduce moisture levels in the same products to 2–8% as required by QP Corp. It also has a significant effect on other characteristics of the meat as is set out below.

The deleterious effects of freeze-drying meat are well documented:

Freeze-drying and Advanced food technologies
S. A. Goldblith, L. Rey and W. W. Rothmayr edo
Academic Press New York, 1975
Chapter 18 Freeze-drying of sliced beef; N. Bengtsson At the lower moisture levels referred to in the QP Corp patent, drying has the following effects:

(1) changes take place in the protein structure and reduction in water-binding capacity results
(2) non-enzymatic browning occurs on storage
(3) oxidation changes occur to fat, protein and meat pigments.

These changes lead to a taste described as "woody" in the rehydrated product (Penny et al Jn Sci Fd Agric 1963 Vol 14, Pg 535) and the re-hydrated product is generally tougher and dryer although the relative significance of these effects depends on both the method of re-hydration and the subsequent cooking process. Further details of the inherent problems of freeze-drying meat are set out in:

Processed Meats 2nd Edition AVI Publishing, Connecticut, A. M. Pearson and F. E. Tauben Water content is a major factor affecting the rate of lipid oxidation. Very low water contents in fat-containing foods is conducive to rapid oxidation. For example oat flakes dried at 180° C. to a water content of 2.6% had a shelf life of less than 2 weeks but similar flakes with a water content of 10% were stable for 8 months. It has been shown that most foodstuffs exhibit oxidation rates that are strongly dependent on water activity with each system exhibiting its own characteristic minimum rate at an intermediate water activity. Moreover if foodstuffs (especially meat) are over dried, the physical properties of any reconstituted foodstuff are adversely affected.

It has been discovered that a reduction of the moisture level to a range from about 30% to about 40% moisture has significant structural implications for meat. In the following article:

Influence of the degrees of hydration on the thermal expansion of muscle tissue: Monday M. J. and Mile C. A. Intern. Jn. of Food Sci Tech 1988, 23, 177;

data is set out which implies that meat has a critical moisture content of 32–45% with a mean value of 39%. At levels above this value any moisture is present as "free" water whilst below this figure all water is "bound" to the protein structure. Other workers using quite different techniques have found the critical moisture content as 25–26%, the actual value varying between beef types and between animal species.

Thus it is postulated that removal of "free" moisture down to about 30% to about 40% or lower in some instances depending on the meat type allows penetration and extraction of the lipid containing material as well as a significant quantity of cholesterol.

Meat de-watered to this level has found to retain its original texture, its water-binding capacity and its organoleptic properties provided the de-hydration and extraction temperatures were held at 45° C. or below.

Thus the current application involves a quite novel approach to extraction based on moisture content reduction to remove "free water" from the meat internal structure.

FREE WATER CONTENT

The "free water" and "bound water" content of meat is described by Reiner Hamm in "Biochemistry of Meat Hydration", in: Advances in Food Research, Vol. 10, 1960, pp 356 et seq.

The relative proportions of "free water" and "bound water" varies from meat type to meat type, and varies within species of animal. We have found that if the moisture content of the meat is reduced to about 30% to about 40% of the moisture content of the meat, substantially all of the "free water" will have been removed, and depending upon the meat type, a small percentage of the "bound water" may have been removed. The percentage of "free water" or "bound water" can be determined by the methods described by Reiner Hamm at pages 364–367 of "Biochemistry of Meat Hydration" or by Monday et al. It will thus be apparent to those skilled in the art, that the percentage of "free water" of a particular type of meat to be processed, can be readily determined, so that the amount of water reduction can be determined in order to optimise the production of an intermediate moisture product suitable for the removal of cholesterol and/or fats by means of sub or supercritical $CO_2$. If too much of the "bound water" is removed from the meat, the meat structure will be adversely affected, which in turn adversely affects the prospects of reconstituting the intermediate moisture product into a palatable product.

PREFERRED PROCESSES

Figure 2:
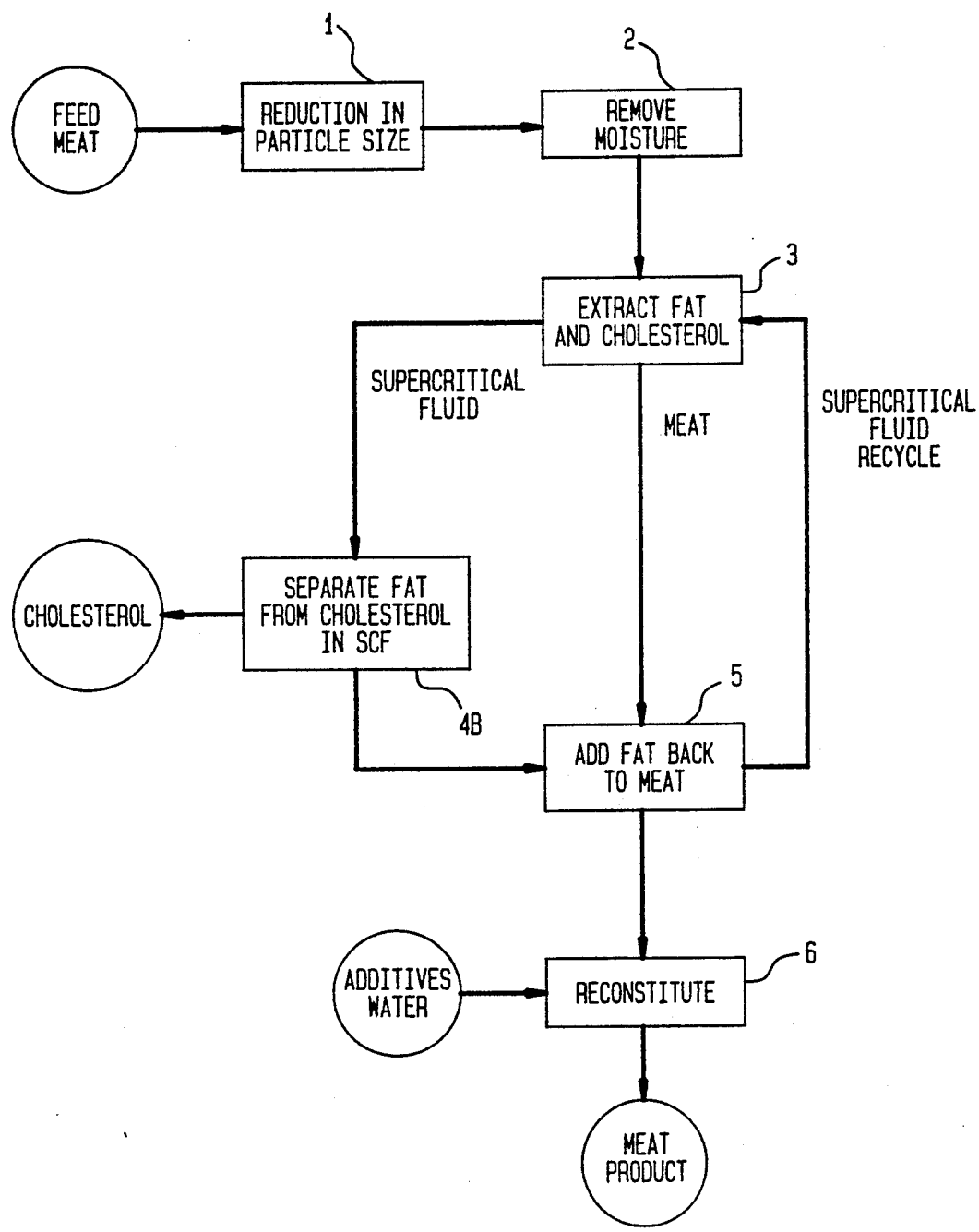
FIG. 2 is a flow chart showing a second process for the removal of lipid components from meat, with the option of separating the cholesterol from the fat and adding back some of the cholesterol-free fat to the meat during reconstitution.
Figure 3:
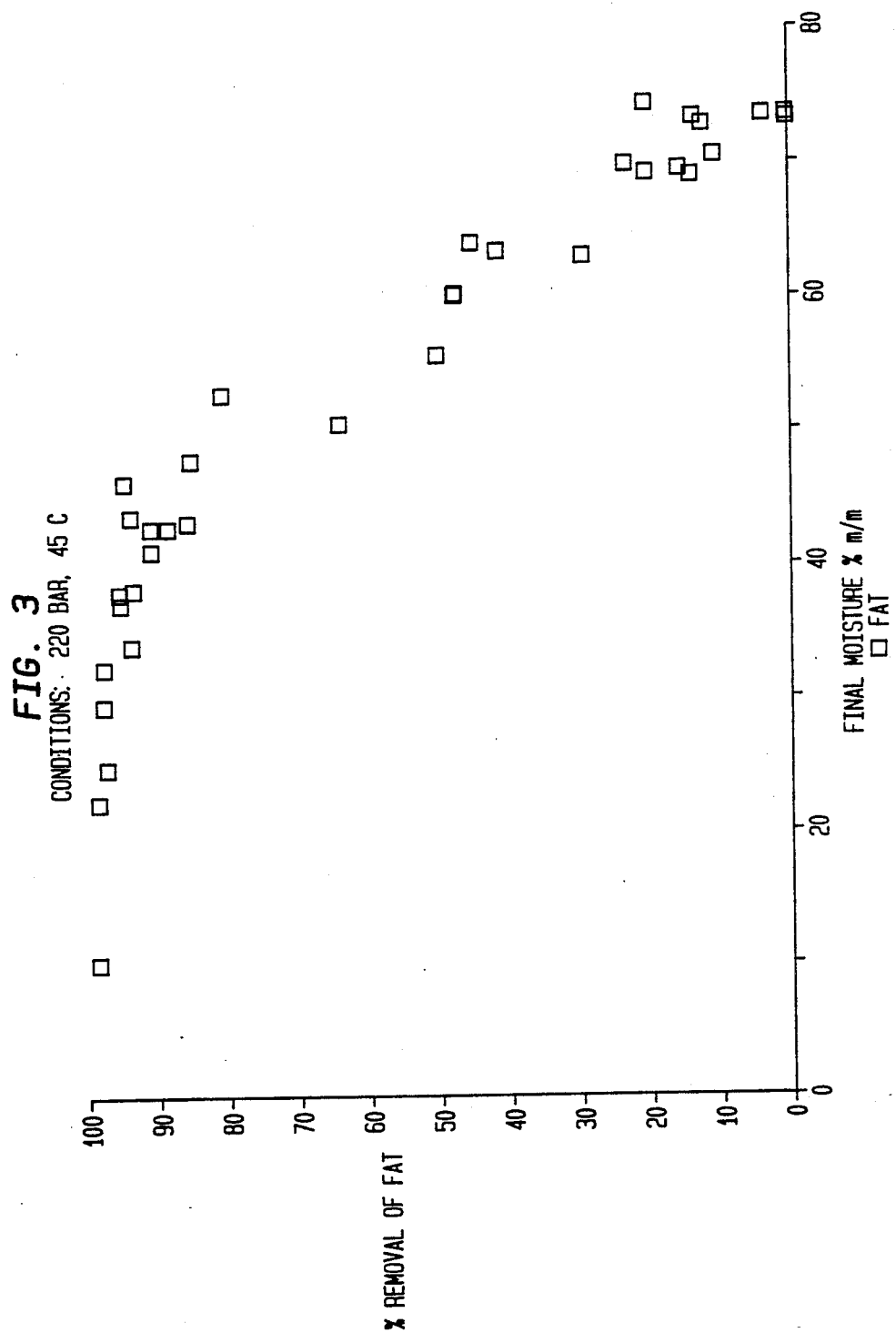
FIG. 3 is a graph showing the results of trials plotted to show the relationship between moisture content and percentage removal of fat.
Figure 4:
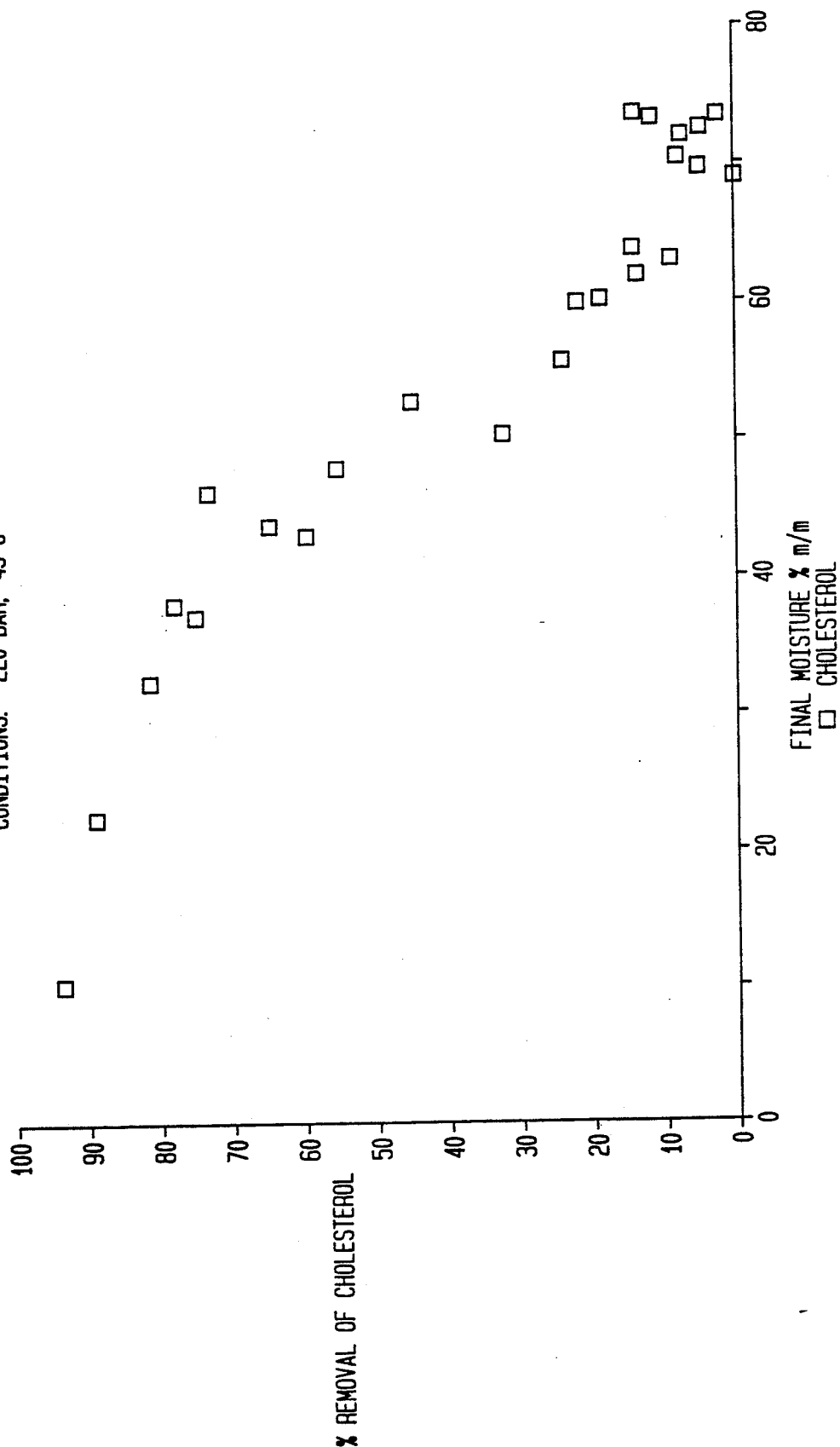
FIG. 4 is a graph showing the results of trials plotted to show the relationship between moisture content and percentage removal of cholesterol.

Three processing schemes are shown, the first giving a product with low fat and low cholesterol (FIG. 1), the second a low cholesterol product with the fat added back (FIG. 2), and the third giving a low cholesterol product. The process steps are in numerical order:

1. meat preparation (including particle size reduction)
2. moisture removal,
3. extraction of the lipid components using a sub or supercritical fluid,
4A. optionally separation of the fat and the cholesterol from the sub or supercritical fluid,
4B. optionally separating the fat from the cholesterol,
4C. optionally separating the cholesterol from the sub or supercritical fluid by use of a selective adsorbent,
5. optionally adding some of the cholesterol-free fat back to the now low fat processed meat, and
6. finally reconstitution of the meat product by adding water and other additives.

These process steps are described in more detail below.

PROCESS STEPS

Process 1 (FIG. 1)—Low Cholesterol and Fat Product

1: Reduction in particle size

A supply of fresh, lean meat (which may be trimmed and deboned) is chopped, minced, sliced, flaked or diced to provide as large as possible surface area for drying (moisture removal). This is preferably carried out in an inert atmosphere, eg Nitrogen. As soon as the meat has been prepared in this manner, it is preferably stored in the absence of oxygen (eg in Nitrogen or in mixtures of Nitrogen and $CO_2$) in an appropriate fashion ready for the next stage.

The chopping, mincing, slicing, flaking, dicing, or the like of the meat, is preferably carried out in such a way that the size of the meat particle produced is not too small and that the exposed surface formed is not covered by a protein film that is thick enough to reduce the effectiveness of any following treatment step.

Basically, whenever a previously unexposed surface is disrupted in any way, water soluble protein (myosin) is leached onto the surface. The protein film is "sticky" and this greatly aids in the rebinding of meat particles. However the protein film is hydrophillic and forms an effective mass transfer barrier for the solvent ($CO_2$) and for lipid materials which are hydrophobic. Such a film is discussed below with reference to the reconstitution step 6.

Thus the reduction in particle size is preferably carried out by slicing or flaking frozen meat.

2: Moisture Removal/Drying: Options

A: Partial Freeze-drying

After the particle reduction step, the meat is spread in thin, even layers on freeze drier trays, and then frozen in an inert (eg Nitrogen) atmosphere at −10° to −20° C. The frozen material then can be partially freeze dried, preferably in the absence of oxygen. This can be conveniently carried out in a combination microwave/freeze drier, preferably drying the meat flakes to a moisture content in the range 30–55% w/w. The freeze dried material is then refrozen preferably in an inert atmosphere, in preparation for extraction.

B: Moisture Removal using a Sub or Supercritical Fluid

After the particle reduction step, the meat at its original moisture content is preferably frozen in an inert (eg Nitrogen) atmosphere until ready for moisture removal. The sub or supercritical fluid (eg $CO_2$) is used at the extraction temperatures and pressures listed in step 3 to remove water. Upon reaching a certain moisture content, fat and cholesterol will also be extracted. The meat should be dried to the range 30–55% w/w. Note also that small amounts of entrainers, such as ethanol, propan-2-ol, and other low molecular weight liquids which are acceptable as food additives, may be used in a mixture with the sub or supercritical fluid. Moisture removal, using the above entrainers as solvents, is also possible.

C: Moisture Removal using Heat (Cooking)

After the particle reduction step, the meat can be partially dried by the application of heat using traditional cooking apparatus, eg thermal oven or microwave but in all cases preferably in the absence of oxygen. Also included in this step is the possibility of mechanical pressing after cooking which further reduces the moisture level. The moisture level should be in the range 45–60% w/w and preferably in the range 50–55%.

Of the options available partial freeze drying (Option A) is the preferred method. The use of inert atmospheres is preferable where fatty meat is used, as this minimises the formation of sterol oxides which are deleterious to health and are not readily soluble in the sub or supercritical fluid of step 3.

3: Extraction: Options

In a high pressure fluid extraction process, pressure and temperature are the controlling parameters. A substance is in the supercritical state when it is above its critical temperature, Tc, and pressure, Pc. In this state, it can no longer be compressed into a liquid, for any pressure. For $CO_2$, Tc=31.3° C., and Pc=72.8 Bar. A subcritical liquid is a fluid with a pressure greater than its equilibrium vapour pressure but with a temperature less than Tc. Both sub and super critical fluids can be used for extraction purposes.

Suitable extraction: 50–400 Bar (preferably 200–250 Pressures Bar)

Suitable extraction temperatures: 30°–60° C. (preferably 35°)

Suitable extraction fluids: $CO_2$, $N_2O$, $CF_3Cl$, $CF_2Cl_2$, $CH_2CF_2$, $SF_6$, $CHF_3$, $CHF_2Cl$, $CF_3Cl$, $C_3F_8$, ethane, ethylene, or mixtures thereof, and other gases unobjectionable from a health point of view, and which will be sub or supercritical in temperature and pressure ranges suitable for the processing of foodstuffs. Entrainers, as mentioned in step 2 can also be used in conjunction with the high pressure fluid. In addition the moisture content of the fluid may be modified.

Of the options available, the preferred extraction pressures are in the range 200–300 bar, and temperatures in the range 30°–50° C., using $CO_2$ as the extracting agent. Temperatures above 60° C. should not be used, so as to avoid protein denaturisation. $CO_2$ was chosen as our preferred extractant because it is a good solvent, it is physiologically inert, it has bacteriocidal properties and has relatively low supercritical temperature and pressure requirements.

4: Separation of the Lipids from the Sub or Supercritical Fluid

The high pressure fluid, e.g. $CO_2$, after leaving the extraction stage, is laden with dissolved fat and cholesterol. In the separation stage, these components are stripped from the fluid, which is then recycled.

A: Decrease in Temperature

The fat and cholesterol can be stripped by a reduction in temperature to a level at which the solubility is reduced, or negligible. This range is from 20° C. downwards for $CO_2$. The fluid remains at high pressure, and can be recycled.

B: Decrease in Pressure

The fat and cholesterol can be stripped from the fluid, e.g. $CO_2$, by reducing the pressure. This can be combined with a change in temperature. The pressure can be reduced to atmospheric, with no recycle of solvent; or can be reduced in the range 50–100 bar, and recycled.

Of the options listed, option A is preferred, as it results in lower energy requirements.

6: Reconstitution

At this stage water, and other additives or fillers e.g. vegetable proteins, skim milk powder, wheat flour or wheat gluten, corn starch, soy concentrate, emulsified fat (including if required any fat stripped of cholesterol) which are deemed necessary for the formation of the required meat product will be added back to the meat. It will be appreciated that the extent and nature of the additives will depend upon the type of meat product required. Reconstitution can be carried out as part of this process or in a separate plant if the product is shipped in the dried or partly dried state.

It will also be appreciated that reconstitution will generally be achieved by mechanical working e.g. by tumbling or massaging the meat particles and at this time it is permissible and indeed desirable to form a sticky protein film to bind the particles together. This protein film or sticky exudate is discussed in:

"Restructured Meat Products" "A Review." Smith, D. R., Food Tech. in Australia, 36(4), 1984, 178–180.

"Binding of Meat Pieces; Influence of Some Processing Factors on Binding Strength and Cooking Losses." MacFarlane, J. J., Turner, R. H. and Jones, P. N., J Food Sci, 51(3), 1986, 736–741.

"Restructured Red Meat Products in Review." Seideman, S. C. and Durland, P. R., J Food Quality, 6, 1983, 81–101.

Process 2 (FIG. 2)—Low Cholesterol Product

Steps 1–3, and step 6 are identical to process 1.

4: Separation of the cholesterol from the fat

Any convenient process can be used for this, e.g. a solvent such as n-hexane or acetone or partial fractionation in the high pressure solvent.

5: Re-addition of Fat

In this stage, the fat, which has been separated from the cholesterol, can be partially or totally redeposited on and within the meat structure. This is conveniently carried out by dissolving the fat (free of cholesterol) in the high pressure fluid, so that this stage is in effect the same as separation stage 4-Process 1 (i.e. the reverse of the extraction stage 3) except that redeposition occurs on the meat, instead of the separation vessel walls.

The preferred method of redeposition is a reduction in temperature, allowing the high pressure fluid to be recycled.

Figure 5:
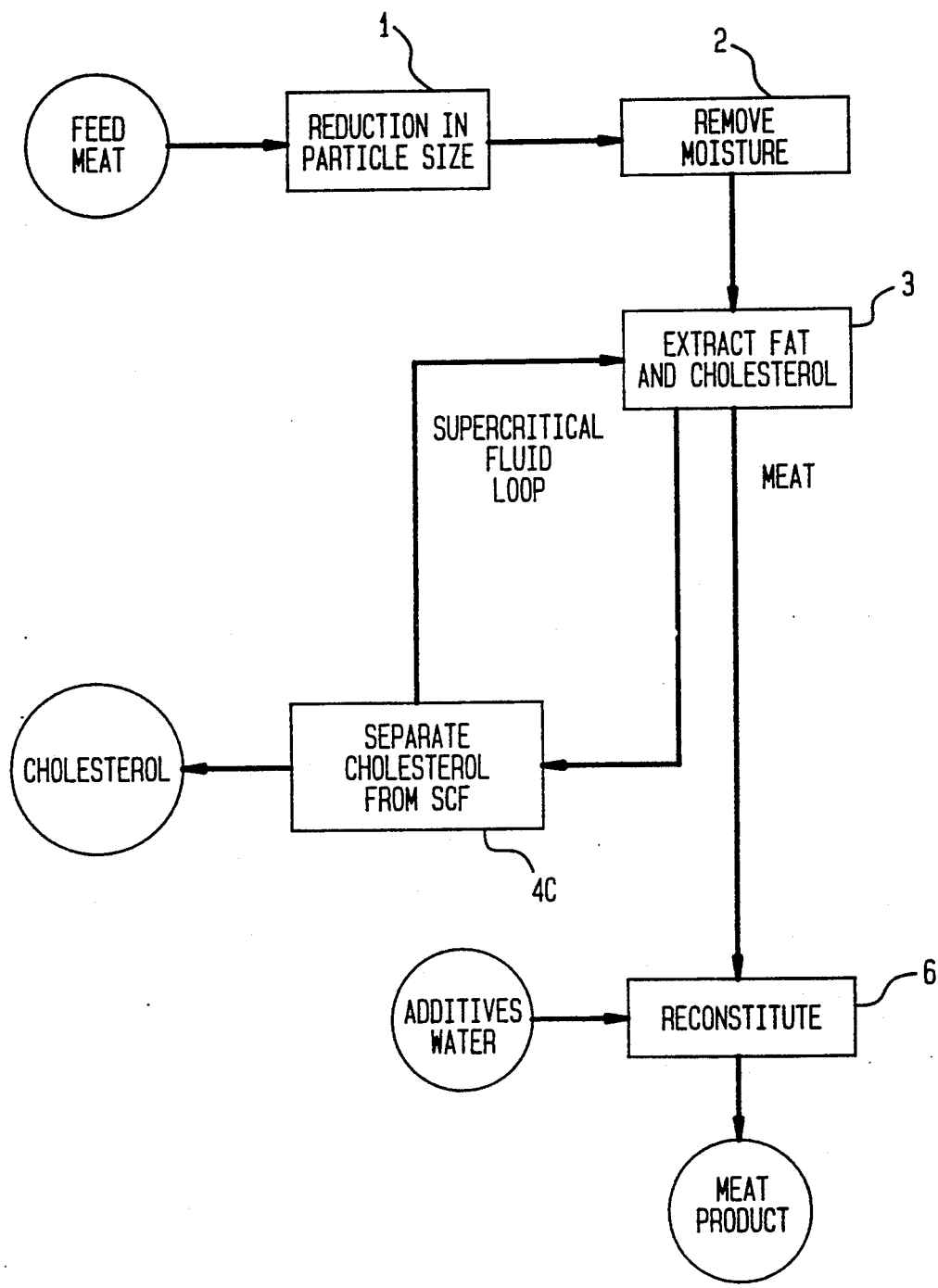
FIG. 5 is a flow chart showing a third process for the removal of cholesterol from meat.

Process 3 (FIG. 5)—Low Cholesterol Product

Steps 1-3, and step 6 are identical to process 1.

4C: Separation of cholesterol from the high pressure fluid

This is preferably achieved by passing the high pressure fluid, e.g. $CO_2$, through an closely packed column of adsorbent material, which is preferably granulated or pelletized with a particle size chosen in order to provide a good flow path through the column, whilst at the same time maximising the surface area of the adsorbent material.

It is preferred that the column has multiple entry and exit points so that different portions of the bed can be used at different times to adsorb the cholesterol. By suitably separating the different portions of the bed, it is possible to use one portion of the bed whilst another portion is being stripped of its cholesterol.

Basic metal oxides, as well as their hydroxides, carbonates, sulphates, and other oxygen containing compounds, are the preferred adsorbent materials. Calcium carbonate, calcium oxide, magnesium carbonate, magnesium oxide and magnesium hydroxide are the most preferred of the naturally occurring adsorbent materials, although other appropriate adsorbants include (but are not limited to) the oxides, hydroxides, carbonates, sulphates, carboxylates and other oxygen containing compounds of magnesium, calcium, strontium, barium, cadmium, cobalt, manganese, iron, nickel, and zinc. Preferably the metal is in the valence II state where it can exist in other states as well. Organic adsorbants such as carbohydrates e.g. $\beta$-cyclodextrin may also be used. They may be used alone or in mixtures, and preferably are used in their naturally occurring form. Complex compounds such as hydrotalcite type minerals may also be used.

Some of these are not suited to a food grade product and hence can be used in situations where the resulting product such as sterol free fat does not need to be of food grade.

The choice of adsorbent material, will depend upon the design of the plant, the strength of adsorption of the material, and the particle size and strength of the material. In the case of a bed or columns it is important to avoid channelling which allows the high pressure fluid to pass through the column without absorption. It is also desirable to avoid the breakdown of the material into a fine powder which would have the opposite effect of clogging the column. Thus the adsorbants can be provided in pellitized or granulated form, or as naturally occurring minerals, or deposited into suitable substrates such as glass beads or rings or onto substrates of high specific surface area such as activated carbon or activated alumina.

It has been discovered that the most suitable materials are the oxides, hydroxides, carbonates, sulphates, and other oxygen containing compounds of metals selected from alkali metal, alkaline earth metal, transition metal and zinc. The adsorbent material can be chosen in terms of its relative strength of adsorption. We have found that for a given anion the strongest adsorption of sterols by these oxygen containing salts is shown by magnesium and this decreases through nickel, cadmium, cobalt, zinc, calcium, strontium to barium which shows the least adsorption of this group.

The preferred material is calcium carbonate for use with high pressure carbon dioxide. We have found that by using basic oxides or hydroxides with supercritical carbon dioxide they are converted in the adsorption column into the corresponding carbonate. As calcium carbonate is an inert, low cost, naturally occurring mineral, it is the preferred material for use in this cholesterol adsorption process.

The flow rate of the high pressure fluid, and the quantity of fat/cholesterol mixture dissolved in the fluid is preferably controlled so that substantially all of the cholesterol is selectively adsorbed on the bed (with minimal adsorption of the fat except where controlled separation of the triglycerides is required) so that the high pressure fluid leaving the bed in most cases consists of substantially all of the fat with complete or almost complete removal of the cholesterol present. By allowing the high pressure fluid to be recycled to the meat at substantially constant pressure, an equilibrium lipid level will be approached in the fluid, whilst the cholesterol is removed from the fluid by the adsorbent.

Alternatively, some or all of the fat can be stripped from the high pressure fluid by an increase in temperature to a level at which the solubility of the fat in the high pressure fluid is reduced, or becomes negligible. This ranges from $10°-31°$ C. greater than the extraction temperature for $CO_2$. The fluid remains at high pressure, and is recycled.

Addition of fat to the extractate

The addition of fat to freeze-dried meat to prevent crumbling as is the general mixing of meat and fat in any proportion to raise fat levels is well known. The current process has the following advantages which differs substantially from the simple addition of fat to freeze-dried meat.

As an alternative to temperature reduction to simultaneously remove cholesterol and fat from the supercritical fluid the cholesterol alone may be removed from the supercritical fluid by absorbing it onto a suitable adsorbent, e.g. calcium carbonate (as described in process 3).

Such an absorbent should not concurrently absorb significant quantities of lipid. This obviates the need for lipid re-addition to the meat after extraction if required.

Under such a process if may be beneficial to reduce the extraction pressure to 100–150 bar, preferably 120–150 bar. At this pressure the relative volume of extraction of lipids drops dramatically compared to cholesterol whilst the cholesterol extraction still remains at a reasonable level.

The hitherto undisclosed outstanding bacteriological qualities of meat subject to such an extraction procedure combining moisture removal with extraction by supercritical $CO_2$ results in meat and fat which are essentially bacteria-free. At the present time USDA regulations require that hamburger patties, in particular, consist only of ground-beef without the addition of added fat; hence the process of this invention is particularly suited to the preparation of meat for hamburger patties.

BACTERIOLOGICAL QUALITIES OF THE MEAT

It has long been appreciated that $CO_2$ possesses significant bacteriostatic and bacteriocidal properties. In 1933 Swearingen J S and Lewis I. M., J. Bateriol 26, 201 reported that $CO_2$ at 25 atmospheres and 20 minute contact time gave kill rates of on *E. coli* of between 95 and 99 percent.

However the bacteriological efficiency of supercritical $CO_2$ has not been examined in any detail. We have found that under the extraction conditions chosen for maximum lipid and cholesterol extraction of this invention it was discovered that bacteria reduction from levels of $10^4$–$10^5$ units/gm to approaching zero were achieved. This is to say no growth of bacteria was detected after treatment. The low cholesterol intermediate moisture meat product so treated still retained its colour and texture after 4 months at 5° C.

EXAMPLES

In the following examples the changes in fat and cholesterol are calculated on a non-extractable basis. The non extractable material (ash, protein, complex lipids) is unchanged over an extraction run, whilst levels of fat, cholesterol and water can change.

Samples are measured for fat, cholesterol and water contents before and after extraction, on a wet basis. The conversion to non-extractable basis, using the feed (or pre-extraction) figures as an example, is as follows:

% FAT, NON EXTRACTABLE =

$$\frac{\% \text{ FAT, wet basis}}{\left(1 - \frac{\% \text{ Fat, wet basis}}{100} - \frac{\% \text{ Moisture}}{100} - \frac{\% \text{ Chol}}{100}\right)}$$

Experiments were performed on a once through flow basis

EXAMPLE A

Use of an Entrainer—See Table A

Experimental conditions: Meat sample—lean rump steak, sample size 15.01 g
Run. No. 153
Pressure: 220 bar
Temperature: 45° C.
Entrainer: Propan-2-ol, at 3.2 ml min-1 for 60 minutes
Run time: 80 minutes
$CO_2$ usage:
4.60 kg (60 minutes) (with entrainer)
1.63 kg (20 minutes)
6.23 kg (total)
Propan-2-ol was continuously fed as an entrainer for 60 minutes at a weight ratio of 0.032 g/g.

TABLE A

| Run No: 153 | % Moisture Wet Basis | % Fat Wet Basis | Chol, mg/100 g Wet Basis | % Fat Nonex Basis | Chol, mg/100 g Nonex Basis |
|---|---|---|---|---|---|
| BEFORE | 74.0 | 1.80 | 55.0 | 7.4 | 241 |
| AFTER | 68.3 | 1.58 | 68.9 | 5.2 | 209 |
| CHANGE | | | | 29.5% | 13.3% |

EXAMPLE B

—See Table B

Samples of chicken, lamb and fish were extracted in an as received form. Whilst some fat is removed, these products require some moisture removal.
Run no. 142 is a chicken meat sample, whilst
Run no. 140 is a lamb meat sample.
Experimental conditions:
Pressure: 220 bar
Temperature: 45° C.
$CO_2$ usage: 5.29, 5.47 kg respectively
Run time: 80 minutes.

TABLE B

| | % Moisture Wet Basis | % Fat Wet Basis | Chol, mg/100 g Wet Basis | % Fat Nonex Basis | Chol, mg/100 g Nonex Basis |
|---|---|---|---|---|---|
| Run No: 142 (chicken) | | | | | |
| BEFORE | 76.2 | 1.34 | 58.2 | 6.0 | 311 |
| AFTER | 69.7 | 1.10 | 62.9 | 3.7 | 300 |
| CHANGE | | | | 37.2% | 3.5% |
| Run No: 140 (lamb) | | | | | |
| BEFORE | 75.3 | 3.45 | 62.0 | 16.2 | 292 |
| AFTER | 74.4 | 2.92 | 65.9 | 12.8 | 290 |
| CHANGE | | | | 20.6% | 0.7% |

TABLE C

| | % Moisture Wet Basis | % Fat Wet Basis | Chol, mg/100 g Wet Basis | % Fat Nonex Basis | Chol, mg/100 g Nonex Basis |
|---|---|---|---|---|---|
| Run No: 54.1 | | | | | |
| Non-Cooked | | | | | |
| BEFORE | 63.9 | 18.18 | 62.9 | 101.5 | 351 |
| AFTER | 64.0 | 16.03 | 65.5 | 80.2 | 328 |
| CHANGE | | | | 21.0% | 6.6% |
| Run No: 185 | | | | | |
| Cooked | | | | | |
| BEFORE | 58.1 | 12.80 | 90.9 | 43.9 | 312 |
| AFTER | 59.9 | 7.50 | 79.8 | 23.0 | 245 |

TABLE C-continued

|  | % Moisture Wet Basis | % Fat Wet Basis | Chol, mg/100 g Wet Basis | % Fat Nonex Basis | Chol, mg/100 g Nonex Basis |
|---|---|---|---|---|---|
| CHANGE |  |  |  | 47.6% | 21.5% |

TABLE D

|  | % Moisture Wet Basis | % Fat Wet Basis | Chol, mg/100 g Wet Basis | % Fat Nonex Basis | Chol, mg/100 g Nonex Basis |
|---|---|---|---|---|---|
| Run No: 90.1 |  |  |  |  |  |
| BEFORE | 72.3 | 5.15 | 51.4 | 22.8 | 228 |
| AFTER | 72.2 | 4.80 | 52.7 | 20.9 | 229 |
| CHANGE |  |  |  | 8.6% | −0.6% |
| Run No: 152 |  |  |  |  |  |
| BEFORE | 54.0 | 13.25 | 96.3 | 40.5 | 294 |
| AFTER | 50.0 | 5.70 | 79.3 | 13.0 | 181 |
| CHANGE |  |  |  | 67.9% | 38.6% |
| Run No: 88.1 |  |  |  |  |  |
| BEFORE | 45.3 | 14.60 | 118.8 | 36.4 | 296 |
| AFTER | 43.9 | 1.28 | 58.7 | 2.3 | 107 |
| CHANGE |  |  |  | 93.6% | 63.9% |

EXAMPLE C

—See Table C

Samples of high fat content meat were extracted. This example gives a comparison of the fat and cholesterol change for steak mince in an as received form, and steak mince which had been microwaved to an initial water content of approximately 60%.

Run No. 54.1 is a non cooked steak mince sample.

Run No. 185 is a partially cooked (by microwave) steak mince sample.

Experimental Conditions:
Pressure: 220 bar
Temperature: 45.0° C.
$CO_2$ usage: 4.56, 4.77 kg (respectively)

Saturated silica gel was used to moisten the high pressure extraction fluid and to maintain the moisture level of the various meats over the extraction runs.

EXAMPLE D

—See Table D

The cholesterol and fat removal for samples of lean meat at various moisture contents is included in graphical form, and three moisture contents in table form.

Run No. 90.1 is a non freeze dried lean meat sample (rump steak).

Run No. 88.1 is a partially freeze dried lean meat sample (rump steak).

Run No. 152 is a partially freeze dried lean meat sample.

EXAMPLE E

—See FIGS. 6 and 7

These figures show the influence of temperature and pressure on the removal of lipids and sterols from an intermediate moisture meat product that has been freeze dried in air (rather than in the absence of oxygen as in the earlier examples). The starting material was finely sliced grass fed beef that had been chopped using an URSCHEL COMITROL in the presence of dry ice snow to keep the product frozen during cutting.

Tasting of the reconstituted meat product revealed a change in taste from the "strong" taste of "grass-fed beef" to a milder taste approximating that of "grain fed beef" or the mild taste of veal. The product had a light brown colour approximating that of rabbit meat but when allowed to re-bloom in the presence of oxygen it took on a more pronounced red colour.

CONCLUSIONS

The various runs were plotted on the graphs of FIGS. 3, 4, 6 and 7 and it is apparent that removal of fat and cholesterol does not become commercially significant until the moisture content of the food drops below 60% as by then most of the "free water" has been removed from the meat. The moisture content of the partially freeze dried meat used in runs 88.1 and 152 falls in the preferred range of 30–55% moisture content during extraction with supercritical $CO_2$, whereas runs 153, 142, 140, 54.1 and 90.1, show the much smaller percentage change of both fat and cholesterol content if the moisture level is above 60%. Run 185 is just below this threshold and it will be noted that if the meat is cooked the moisture content will generally be in the range of 50–60%.

VARIATIONS

Although most of the description has been concerned with beef samples it will be appreciated that the process can be used to modify the flavour of many foodstuffs and to remove lipids and/or sterols therefrom. Tests on fish show that the resulting product has is denser than the original and maintains its texture during cooking, whilst removing some of the more unpleasant "fishy" odours. Processed foods such as ham can also be treated by this invention to modify the flavour and reduce fat content.

Finally it will be appreciated that various alterations or modifications may be made to the foregoing processes without departing from the spirit or scope of this invention as set forth in the following claims.

What we claim is:

1. A method of removing sterols and/or lipids from proteinaceous foods comprising the steps of:
   (a) drying a proteinaceous food of the group consisting of meat, poultry and fish to remove all or substantially all of the "free water" and optionally some but not all of the "bound water" therefrom to produce an intermediate moisture containing proteinaceous food product containing not less than about 25 percent of water by weight of such proteinaceus food product; and, (b) removing some of the sterols and/or lipids from such intermediate moisture containing proteinaceous food products using a sub or supercritical physiologically acceptable gas.

2. A method as claimed in claim 1, wherein the sub or supercritical physiologically acceptable gas is carbon dioxide at a pressure in the range of 50–400 Bars, and a temperature in the range 30°–60° C.

3. A method as claimed in claim 1 wherein the water content of the proteinaceous food is reduced to between about 25% to about 60%.

4. A method as claimed in claim 3 wherein the water content of the food is reduced to about 30–40% w/w during the drying process.

5. A method as claimed in claim 1 wherein the proteinaceous food is prepared for drying and removal of some of the sterols and/or lipids by increasing its surface area by chopping, mincing, slicing, flaking, or dicing, in such a way as to minimize the formation of a protein film on any exposed surfaces of the food.

6. A method as claimed in claim 1 wherein the proteinaceous food product is reconstituted after the removal of lipids by adding back water to the intermediate moisture containing proteinaceous food products.

7. A method as claimed in claim 6 wherein the reconstitution of the food also involves adding back fat to the intermediate moisture containing proteinaceous food product.

8. A method as claimed in claim 7 wherein the fat that is added to the intermediate moisture containing proteinaceous food product is substantially cholesterol-free fat extracted from the proteinaceous food by the sub or supercritical physiologically acceptable gas.

9. A method as claimed in claim 1 wherein the proteinaceous food is dried in the absence of oxygen and the resulting intermediate moisture containing proteinaceous food product in maintained in the absence of oxygen prior to lipid removal.

10. A method as claimed in claim 1 wherein cholesterol is selectively removed from the sub or supercritical physiologically acceptable gas by passing it over an adsorbent.

11. A method as claimed in claim 10 wherein the gas is $CO_2$ and wherein the adsorbent selectively removes cholesterol only from the sub or supercritical $CO_2$ gas containing dissolved sterols and/or lipids which is passed over such adsorbent.

12. A method as claimed in claim 10 wherein the adsorbent is selected from oxygen containing compounds of an alkali metal, alkaline earth metal, transition metal, zinc and organic materials.

13. A method as claimed in claim 12 wherein the adsorbent is selected from the oxides, hydroxides, carbonates, sulphates and carboxylates of magnesium, calcium, nickel, cadmium, cobalt, iron, and zinc.

14. A method as claimed in claim 13 wherein the adsorbent is selected from the oxides, hydroxides, carbonates, sulphates and carboxylates of magnesium and calcium.

15. A method as claimed in claim 1 wherein the proteinaceous food is dried in a combination microwave/freeze drier containing an inert gas.

16. A proteinaceous food product produced in accordance with claim 1.

17. A method of making a low cholesterol reconstituted proteinaceous food product comprising the steps of:

(a) drying a proteinaceous food of the group consisting of meat, poultry and fish to remove all or substantially all of the "free water" and optionally some but not all of the "bound water" therefrom to produce an intermediate moisture containing proteinaceous food product containing not less than about 25 percent of water by weight of such proteinaceous food product;

(b) removing at least some of the sterols and/or lipids from the intermediate moisture containing proteinaceous food products using a sub or supercritical $CO_2$ gas;

(c) passing the $CO_2$ gas containing dissolved sterols and/or lipids over an adsorbent to selectively remove cholesterol from the $CO_2$; and (d) adding water and fat, reduced in cholesterol content, to the low cholesterol intermediate moisture containing proteinaceous food product to form a low cholesterol reconstituted proteinaceous food product.

18. A method as claimed in claim 17 wherein the fat added to the proteinaceous food product in step (d) is present in the $CO_2$ gas containing dissolved sterols and/or lipids which is passed over an adsorbent to selectively remove cholesterol from the $CO_2$ gas from step (c).

19. A method as claimed in claim 17 wherein the pressure of the supercritical $CO_2$ is between 100 to 150 bars.

20. A method as claimed in claim 19 wherein the pressure is between 120 and 150 bars.

21. A method as claimed in claim 17 wherein the adsorbent is packed in a column or bed.

22. A method as claimed in claim 21 wherein the column or bed has multiple inlet and outlets for the gas stream.

23. A method as claimed in claim 17 wherein the adsorbent selectively removes cholesterol only from the sub or supercritical $CO_2$ gas containing dissolved sterols and/or lipids which is passed over said adsorbent.

24. A method as claimed in claim 23 wherein the adsorbent is selected from oxygen containing compounds of an alkali metal, alkaline earth metal, transition metal, zinc and organic materials.

25. A method as claimed in claim 24 wherein the adsorbent is selected from the oxides, hydroxides, carbonates, sulphates and carboxylates of magnesium, calcium, nickel, cadmium, cobalt, iron, and zinc.

26. A method as claimed in claim 25 wherein the adsorbent is selected from the oxides, hydroxides, carbonates, sulphantes and carboxylates of magnesium and calcium.

27. A low cholesterol proteinaceous food product produced in accordance with claim 17.

28. A method of making a reconstituted proteinaceous food product comprising the steps of:

(a) increasing the surface area of a frozen proteinaceous food of the group consisting of meat, poultry and fish by slicing or flaking and then drying the sliced or flaked proteinaceous food to remove all or substantially all of the "free water" and optionally some but not all of the "bound water" to produce an intermediate moisture containing proteinaceous food product containing not less than about 25 percent of water by weight of such proteinaceous food products;

(b) removing at least some of the sterols and/or lipids from the intermediate moisture containing proteinaceous food product using sub or supercritical $CO_2$; and (c) adding water and fat to the intermediate moisture containing proteinaceous food product of step (b) to form a reconstituted proteinaceous food product.

29. A method of making a reconstituted proteinaceous food product as clamed in claim 28, wherein the frozen proteinaceous food is lean meat and the fat added back at step (c) is meat tallow.

* * * * *

UNITED STATES PATENT AND TRADEMARK OFFICE
CERTIFICATE OF CORRECTION

PATENT NO. : 5,026,565

DATED : June 25, 1991

INVENTOR(S) : Corran N.S. McLachlan; Owen J. Catchpole; Ross S. Nichol

It is certified that error appears in the above-identified patent and that said Letters Patent is hereby corrected as shown below:

Column 9, line 46, change "absor ption" to -- adsorption --

Column 10, line 35, change "absorbing" to -- adsorbing --

Column 10, line 38, change "absorbent" to -- adsorbent --

Column 11, line 29, change "% FAT, wet basis" to -- % Fat, wet basis --

Column 13, line 65, change " URSCHEL COMITROL" to -- Urschel Comitrol --

Claim 9, line 4, after "food product", change "in" (first occur) to --is--

Claim 26, line 3, change "sulphantes" to -- sulphates --

Signed and Sealed this

Nineteenth Day of November, 1991

Attest:

HARRY F. MANBECK, JR.

*Attesting Officer*     *Commissioner of Patents and Trademarks*